US009871852B2

(12) United States Patent
Ruess et al.

(10) Patent No.: US 9,871,852 B2
(45) Date of Patent: Jan. 16, 2018

(54) MONITORING SYSTEM WITH MESSAGE FORWARDING, A METHOD, AND A COMPUTER PROGRAM

(71) Applicant: Robert Bosch GmbH, Stuttgart (DE)

(72) Inventors: Kilian Ruess, Riemerling (DE); Rainer Bauereiss, Baiersdorf (DE)

(73) Assignee: Robert Bosch GmbH, Stuttgart (DE)

( * ) Notice: Subject to any disclaimer, the term of this patent is extended or adjusted under 35 U.S.C. 154(b) by 268 days.

(21) Appl. No.: 14/430,613

(22) PCT Filed: Sep. 20, 2013

(86) PCT No.: PCT/EP2013/069631
§ 371 (c)(1),
(2) Date: Mar. 24, 2015

(87) PCT Pub. No.: WO2014/044826
PCT Pub. Date: Mar. 27, 2014

(65) Prior Publication Data
US 2015/0256604 A1 Sep. 10, 2015

(30) Foreign Application Priority Data
Sep. 24, 2012 (DE) .......................... 10 2012 217 136

(51) Int. Cl.
*G06F 15/16* (2006.01)
*H04L 29/08* (2006.01)
(Continued)

(52) U.S. Cl.
CPC .............. *H04L 67/10* (2013.01); *H04L 51/14* (2013.01); *H04L 63/0281* (2013.01); *H04L 67/12* (2013.01); *H04L 67/42* (2013.01)

(58) Field of Classification Search
USPC ............... 709/223, 224, 225, 226, 227, 231; 370/225, 401
See application file for complete search history.

(56) References Cited

U.S. PATENT DOCUMENTS 6,728,780 B1* 4/2004 Hebert ................ G06F 11/2023
709/225
6,728,781 B1* 4/2004 Aguilera ................ G06F 9/546
709/223
(Continued)

FOREIGN PATENT DOCUMENTS

CN 101103608 A 1/2008

OTHER PUBLICATIONS

International Search Report for Application No. PCT/EP2013/069631 dated Dec. 12, 2013 (English Translation, 3 pages).

*Primary Examiner* — Quang N Nguyen
(74) *Attorney, Agent, or Firm* — Michael Best & Friedrich LLP (57) ABSTRACT

Monitoring installations for buildings, building complexes, open spaces or other monitoring areas can comprise a plurality of system components. These system components can, for example, be designed as door openers, door closers, turnstiles, monitoring cameras, fire detectors, etc. It is standard for the system components to be interconnected via a network such that signals and data streams may be exchanged in the form of information. The invention relates to a monitoring system (1) which comprises: as a first network, a local monitoring network (2) for an object (3) to be monitored, said at least one local monitoring network (2) having at least one terminal; a security control device (13), the local monitoring network (2) being able to be connected to said security control device (13), such that data may be exchanged, by means of a client connection via a second network (4) such that first server messages SN_1 can be sent from the security control device (13) to a terminal address EG and terminal messages EN can be sent from the terminal (7) to the server address SA_C; and at least one user device (19, 25) which can be connected to the security control device (13) by a user connection via the second or a further (Continued)

network (4, 18) such that second server messages SN_2 can be sent from the security control device (13) to a user to one, or the, server address SA_C, SA_B. The security control device (13) comprises a device manager (14) which is designed to forward the terminal messages EN from the terminal (7) to the user address BA, as first server messages SN_1, and to forward the user messages BN from the user device (19, 25) to the terminal address EG, as second server messages SN_2, in order to achieve a user-terminal connection between said terminal (7) and user device (19, 25).

10 Claims, 3 Drawing Sheets

(51) Int. Cl.
*H04L 29/06* (2006.01)
*H04L 12/58* (2006.01)

(56) References Cited

U.S. PATENT DOCUMENTS

| | | | |
|---|---|---|---|
| 6,732,186 B1* | 5/2004 | Hebert | H04L 41/0681 709/226 |
| 8,472,314 B2* | 6/2013 | Durbin | H04L 45/04 370/225 |
| 8,495,190 B2* | 7/2013 | Andrews | H04L 29/12207 709/227 |
| 2006/0092955 A1* | 5/2006 | Durbin | H04L 45/04 370/401 |
| 2006/0173997 A1* | 8/2006 | Tullberg | H04L 29/12509 709/224 |
| 2006/0271695 A1 | 11/2006 | Lavian | |
| 2008/0209513 A1* | 8/2008 | Graves | G06F 19/327 709/227 |
| 2009/0070477 A1* | 3/2009 | Baum | H04N 21/2187 709/231 |

* cited by examiner

MONITORING SYSTEM WITH MESSAGE FORWARDING, A METHOD, AND A COMPUTER PROGRAM

BACKGROUND OF THE INVENTION

The invention relates to a monitoring system. The invention also relates to a method using the monitoring system and to a computer program for the monitoring system.

Monitoring installations for buildings, building complexes, open spaces or other monitoring areas may have a multiplicity of system components. These system components may therefore be in the form of door openers, door closers, turnstiles, monitoring cameras, fire detectors etc., for example. It is conventional for the system components to be connected to one another via a network in order to be able to interchange signals and data streams as information. For such information interchange, it is necessary for the information transmitter and the information receiver to each know the other's network address.

SUMMARY OF THE INVENTION

The invention proposes a monitoring system (can also be called monitoring installation) which is suitable and/or designed for monitoring at least one monitoring area, in particular with regard to a burglary, an alarm or other criteria.

The monitoring system comprises at least one local monitoring network for an object to be monitored or, in the state ready for operation, in the object to be monitored. An object to be monitored is preferably understood as meaning a monitoring area which is cohesive in terms of content. In particular, the object to be monitored is in the form of a cohesive building complex, for example a hospital, an airport, a public or private building etc. The local monitoring network can be or is installed in the object to be monitored. The monitoring network forms a first network. The local monitoring network is, in particular, a network in which the network subscribers have local addresses, in particular local IP addresses. In particular, it is a data network which operates on the basis of the TCP/IP protocol. For example, it is an Ethernet network.

The at least one local monitoring network has at least one terminal as a network subscriber. Optionally, the local monitoring network additionally comprises further terminals. The terminal (also called edge device) is suitable and/or designed for integration in the local monitoring network. In particular, the terminal forms an interface between the local monitoring network and the monitoring area.

The terminal has at least one functional device, the functional device being in the form of a sensor and/or actuator device. The functional device may be, for example, in the form of an automatic or manual fire detector, a temperature sensor, an object sensor, for example a light barrier, a door opener, a turnstile opener etc.

The terminal comprises a control device, the control device being in the form of a digital data processing device. In particular, the digital data processing device is in the form of a computer having an operating system.

The terminal comprises at least one network interface which allows the control device or the terminal to be coupled to the local monitoring network. The network interface and/or the control device allow(s) data to be able to be transmitted from the functional device to the monitoring network and/or data to be able to be transmitted from the monitoring network to the functional device. It is therefore possible, for example, to transmit sensor data from the sensor device to the monitoring network or to transmit command data from the monitoring network to the actuator device. It is also possible, for example, for bidirectional communication to take place for the purpose of configuring the functional device via the network interface.

In one preferred configuration of the invention, the terminal is in the form of a monitoring camera, in particular a digital monitoring camera. In this configuration, it is possible for the monitoring camera to also be in the form of a so-called PTZ camera (pan-tilt-zoom camera) which can change the viewing direction and the image detail in a controlled manner. In this case, configuration data, control data and/or camera images, for example, can be transmitted as data via the network.

The monitoring system comprises a second network and a preferably central security control device, in particular in the form of a server or a server farm, the local monitoring network being connected or being able to be connected in terms of data technology to the security control device via the second network. The second network may be in the form of a public Internet, for example; in modified embodiments, the first network may also be in the form of a telephone connection or another data connection. The first network is particularly preferably in the form of a private network which is provided by an ISP (Internet service provider).

The terminal may be connected in terms of data technology from the local monitoring network to the security control device via the second network in order to establish a client connection. This client connection means that first server messages can be transmitted from the security control device to a terminal address and therefore to the terminal and terminal messages can be transmitted from the terminal to a server address. The server address is the network address of the security control device in the second network, and the terminal address is the network address of the terminal likewise in the second network.

The monitoring system comprises at least one user device which can be and/or is connected to the security control device via the second network or a further network using a user connection.

The user device may be in the form of an agent device, for example. The agent device is preferably in the form of a workstation, in particular a computer workstation, for monitoring personnel as users. The agent device makes it possible to use the terminals, in particular to control the terminals or to accept sensor data from the terminals. In this configuration, the further network is particularly preferably in the form of an intranet, with the result that the agent device is arranged in the local vicinity of the security control device, in particular in a control center of the monitoring system. In an alternative embodiment of the invention, the at least one user device is in the form of a mobile terminal, in particular a mobile telephone. In this configuration, the further network is preferably in the form of a telecommunications network or telephone network. It is also possible for the user connection to run via the second network, in particular the Internet.

After the user connection has been established, it is possible for second server messages to be able to be transmitted from the security control device to a user address and for user messages to be able to be transmitted from the user device to a server address or the server address. The user address is the network address in the second or further network and the server address is the network address in the second or further network. If the client connection and the user connection together run via the second network, the server addresses used may also be identical.

Within the scope of the invention, it is proposed that the security control device has a device manager which is particularly preferably in the form of a software module. The device manager is designed to forward the terminal messages from the terminal, which are transmitted to the server address and therefore to the security control device, in particular the device manager, to the user address and therefore to the user device as first server messages. The device manager is also designed to forward the user messages, which are transmitted from the user device to the server address and therefore to the security control device, in particular the device manager, to the terminal address and therefore to the terminal as second server messages.

The device manager therefore forms bidirectional communication between the user device and the terminal. The bidirectional communication is in the form, in particular, of a transparent channel which implements a virtual direct connection between the user device and the terminal. In this context, transparent means, in particular, that the device manager fundamentally forwards any communication protocol to the terminal. In particular, the device manager readdresses the terminal messages and the user messages.

The advantage of the configuration according to the invention can be seen in the fact that the user device and the terminal need not know each other's network address. Instead, the user device and the terminal must know only the server address in order to establish a user/terminal connection. The user/terminal connection is designed, in particular, in such a manner that all communication protocols available to the terminal or to the user device can be mutually used. In particular, the user messages and/or the terminal messages are forwarded by the device manager without processing. In particular, the user/terminal connection to the user device allows access to a web server integrated in the terminal and to the website thus delivered as if the terminal could be reached in the same local network as the user device and could be reached for direct access.

Further advantages result from the fact that the user devices need not be adapted via the security control device for cooperation with the terminal, but rather can communicate with the terminal via the device manager as if the terminal were installed in the same network as the user device and were therefore locally installed. All functionalities of the terminal can consequently also be reached by the user device from remote networks, in particular beyond network boundaries.

In one preferred configuration of the invention, the terminal has a storage device which stores the server address, the terminal being designed to transmit a message to the server address during initialization of the terminal in order to initialize or establish the client connection. The storage device is particularly preferably in the form of a non-volatile memory. In particular, the storage device is preconfigured, with the result that the server address is stored ex works, for example, in the storage device and is therefore known. The terminal comprises the control device which is designed, in terms of programming and/or circuitry, to transmit a message to the server address via the network interface during initialization of the terminal.

The terminal therefore has the functionality whereby, during initialization of the terminal, the message is preferably transmitted automatically or in an automated manner from the terminal into the local monitoring network and from there into the second network to the security control device as the server, in particular to the device manager, the server address being preconfigured in the terminal. The terminal is therefore designed, in terms of programming and/or circuitry, to actively or proactively set up communication to the security control device, in particular to the device manager, at the preconfigured server address during initialization. The configuration of the terminal makes it possible for the terminal to register with the security control device, in particular the device manager, automatically, in particular without user interaction. This considerably simplifies the installation of the terminal in the monitoring system. The terminal is therefore a technical solution to the problem which exists in a widely distributed network having at least one local subnetwork as the monitoring network and a main network as the second network when the local subnetwork has been separated from the main network by a router or another NAT device, for example. As a result of the separation (NAT), network subscribers (clients) in the local subnetworks are invisible to the application and the user devices in the main network as the second network. The router of the local subnetwork, for example, would conventionally have to be reconfigured in such a manner that individual ports are visible to the clients as terminals in the local subnetwork. However, this method harbors security risks since the enabled port is also visible to other subscribers in the main network.

In contrast, the terminal uses the advantage that it already knows the counterpart station, the security control device as the server or the backend, in advance since the server address is stored in the storage device in a preconfigured manner. The process of setting up the connection from the terminal to the security control device therefore involves communication from the local subnetwork as the monitoring network to the main network as the second network and not the other way round. Conventional routers or NAT devices allow connections in this direction and need not be reparameterized in a complicated manner. The security control device as the server or backend, in particular the device manager, can in turn use the connection which has been set up to communicate with the terminal and to make further requests in order to establish the client connection in this manner. For example, the terminal can be parameterized by the security control device in this manner and data, for example video screens, can be requested or transmitted. The advantages of the configuration of the terminal are that a smaller amount of configuration is needed since it is possible to overcome an NAT boundary without router configuration. The terminal allows a plug-and-play device since the terminal in the local monitoring network must receive only a network address.

In one preferred development of the invention, the device manager is designed to establish a substitute client connection in addition to the client connection. This substitute client connection can be used if another user device requires communication with the same terminal. In this case, a first user/terminal connection may remain via the client connection and a second user/terminal connection may be set up via the substitute client connection.

In one possible development of the invention, the device manager is designed to keep the client connection and/or the substitute client connection open by means of a quiescent protocol. In this case, messages are interchanged between the device manager and the terminal via the client connection and/or the substitute client connection in order to simulate connection activity and to avoid the client connection and/or the substitute client connection being closed on account of a timeout.

In one possible implementation of the invention, the monitoring system has a plurality of terminals in the monitoring network. Consequently, a plurality of user/terminal connections are set up via the security control device, in particular via the device manager. When setting up or operating the user/terminal connections, the user device must specify the terminal with which communication is intended to be effected.

In the case of a TCP/IP connection, ports can be used in order to distinguish different applications on the server of the security control device, in particular of the device manager. A separate port can therefore be opened for each user/terminal connection, with the result that the server address has the notation <IP address>:<port number>; for example, a first terminal is available via 91.13.12.42:91 and a second terminal is available via 91.13.12.42:92, where 91.13.12.42 is the network address of the server having the security control device, in particular the device manager, and 91 or 92 is the port number. The advantage of this configuration is that all protocols based on TCP/IP can be used for the terminal messages and the user messages.

In order to reduce the number of open ports, it is alternatively possible for a common port to be allocated to a plurality of user/terminal connections, the terminals being identified via a virtual path using a higher-order protocol, for example Http. In this case, a first terminal may be available via http://91.13.12.42:91/terminal1 and a second terminal may be available via http://91.13.12.42:91/terminal2. This alternative reduces the open ports, and at least the initial communication is limited to the selected protocol.

In another variant, tickets, in particular in the form of cookies, are allocated, with the result that a session is opened for each user/terminal connection in order to control the assignment of the user device to the selected terminal.

The invention also relates to a method for communicating in the monitoring system as described above, the device manager forwarding the terminal messages from the terminal to the user address as first server messages and forwarding the user messages from the user device to the terminal address as second server messages and thereby establishing a user/terminal connection between the terminal and the user device.

The invention finally relates to a computer program having program code means for carrying out all steps of the method described above when the program is executed on a computer, in particular on the server having the security control device.

BRIEF DESCRIPTION OF THE DRAWINGS

Further features, advantages and effects of the invention emerge from the following description of a preferred exemplary embodiment of the invention and the accompanying figures, in which.

DETAILED DESCRIPTION

Figure 1:
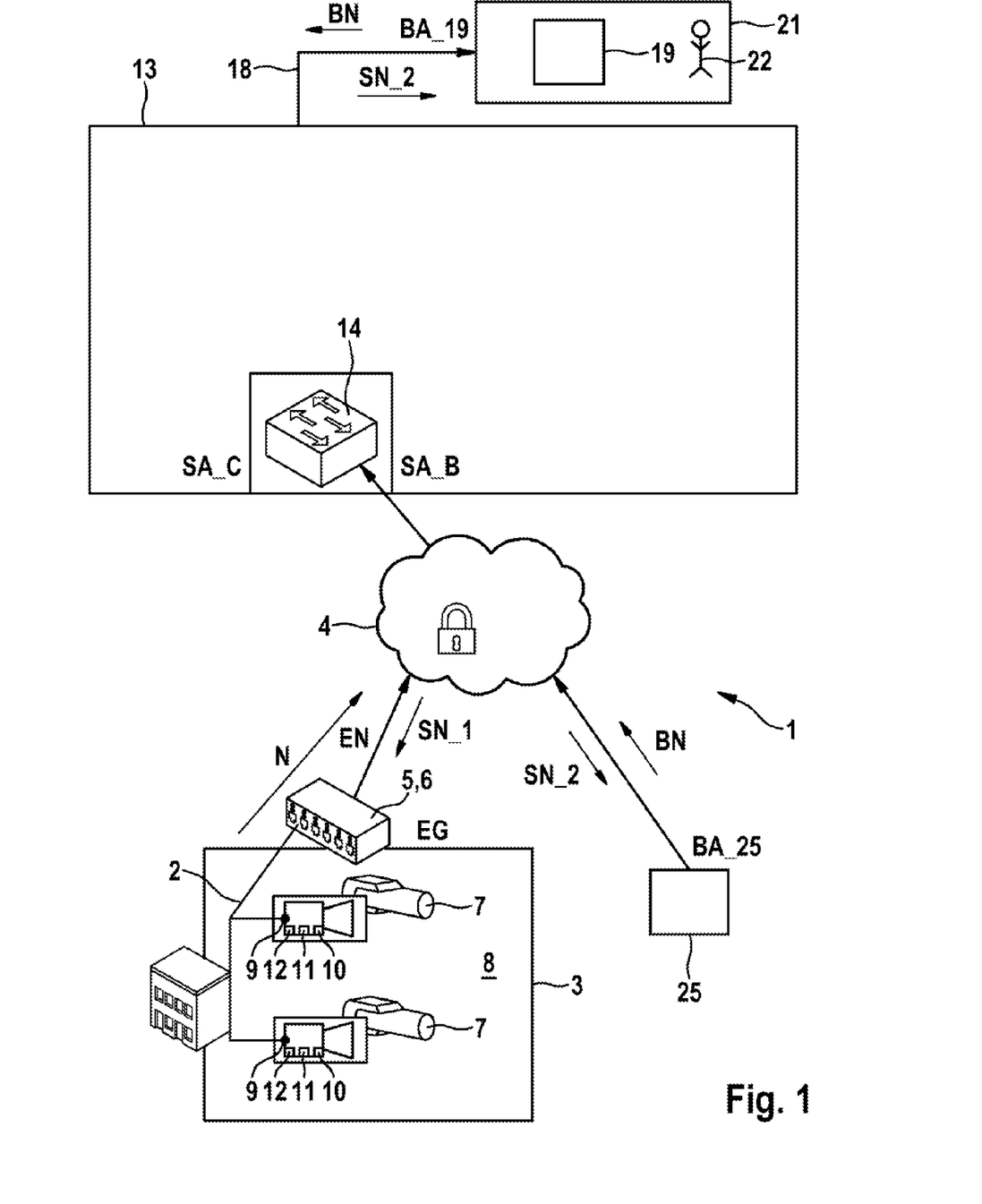
FIG. 1 shows a schematic block diagram of a monitoring system as an exemplary embodiment of the invention.

FIG. 1 shows a schematic block diagram of a monitoring system 1 as an exemplary embodiment of the invention. The monitoring system 1 comprises at least one local monitoring network as a first network 2. The first network 2 is installed in an object to be monitored 3, for example a building or building complex, a train station, an airport etc.

The first network 2 is in the form of a local network and defines a local domain or at least one local domain. The first network 2 is in the form of a LAN, for example. Each of the network subscribers in the first network 2 has a local IP address.

As an interface to a second network 4, the first network 2 has a router 5 which comprises an NAT device 6. The NAT device 6 is designed to translate network addresses between the first network 2 and the second network 4. The first network 2 is, in particular, an exclusively private network, and the second network 4 is the Internet or a tier-3 or tier-2 or tier-1 network.

At least one terminal 7 having a functional device 12 is arranged in the first network 2. In the illustrated embodiment of the terminal 7 as a monitoring camera, the terminal comprises a camera device as the functional device 12 which is designed to monitor a monitoring area 8 in the object to be monitored 3. The terminals 7 each have a network interface 9 via which the terminals 7 in the first network 2 can communicate. The terminals 7 are in the form of intelligent terminals 7 each comprising a control device 10 and a local storage device 11.

The second network 4 is based on the Internet protocol and may be in the form of a public Internet in a first alternative embodiment. Alternatively, the second network 4 is in the form of a private IP network, in which case all interfaces of the second network 4 are exclusively associated with the private IP network and the private IP network is disconnected in terms of data technology from the public Internet, in particular. Alternatively, the other network 4 may also be in the form of a LAN (local area network) or a WAN (wide area network). In particular, the second network 4 implements a TCP/IP connection.

The monitoring system 1 comprises an in particular central or global security control device which is in the form of a server 13. The server 13 is connected in terms of data technology to the second network 4 and therefore indirectly to the first network 2 via an interface.

During operation of the monitoring system 1, monitoring data from the terminals 7 may be forwarded from the first network 2, via the router 5 or the NAT device 6, to the server 13 in the form of the security control device. Depending on its design, the server 13 can then evaluate the monitoring data and can trigger an alarm in an automated manner or can forward the monitoring data to monitoring personnel 22. In the opposite direction, the server 13 can transmit configuration data or data queries to the terminals 7 via the second network 4 and the router/NAT device 5/6. If the terminals 7 are in the form of monitoring cameras, images of the monitoring area 8 are transmitted in the direction of the server 13.

When in the form of intelligent monitoring cameras, the terminals 7 may also carry out autonomous evaluations of the monitoring data with the control device 10. Different terminals 7, for example door openers, fire detectors etc., may also be integrated in the first network 2 as an alternative or in addition to the monitoring cameras.

Local IP addresses are assigned to each of the terminals 7 in the first network 2 as client addresses. An IP address is assigned to the server 13 in the second network 4 as a server address. Provision may optionally be made for the server 13 to in turn be arranged in a local network, in which case the server can nevertheless be reached via the second network 4 using the server address.

When installing the terminals 7, the problem now arises of the terminals 7 in the first network 2 being "invisible" to the server 13 in terms of data technology since they are arranged downstream of the NAT device 6.

In order to establish communication between the server 13 and the terminals 7 in a user-friendly manner, the terminals 7 each have a socket knocker transmitter functionality and the server 13 has a socket knocker receiver functionality. For the purpose of implementation, the storage device 11 of the terminal 7 permanently stores the server address of the server 13. This can be effected, for example, by preconfiguring the terminals 7. The storage device 11 also stores a unique ID of the terminal 7. The storage device 11 also optionally stores a certificate for mutual authentication of the terminal 7 and the server 13. In order to implement the socket knocker receiver functionality, the server 13 has a device manager 14 which is in the form of a program or a service in the server 13, for example.

Figure 2:
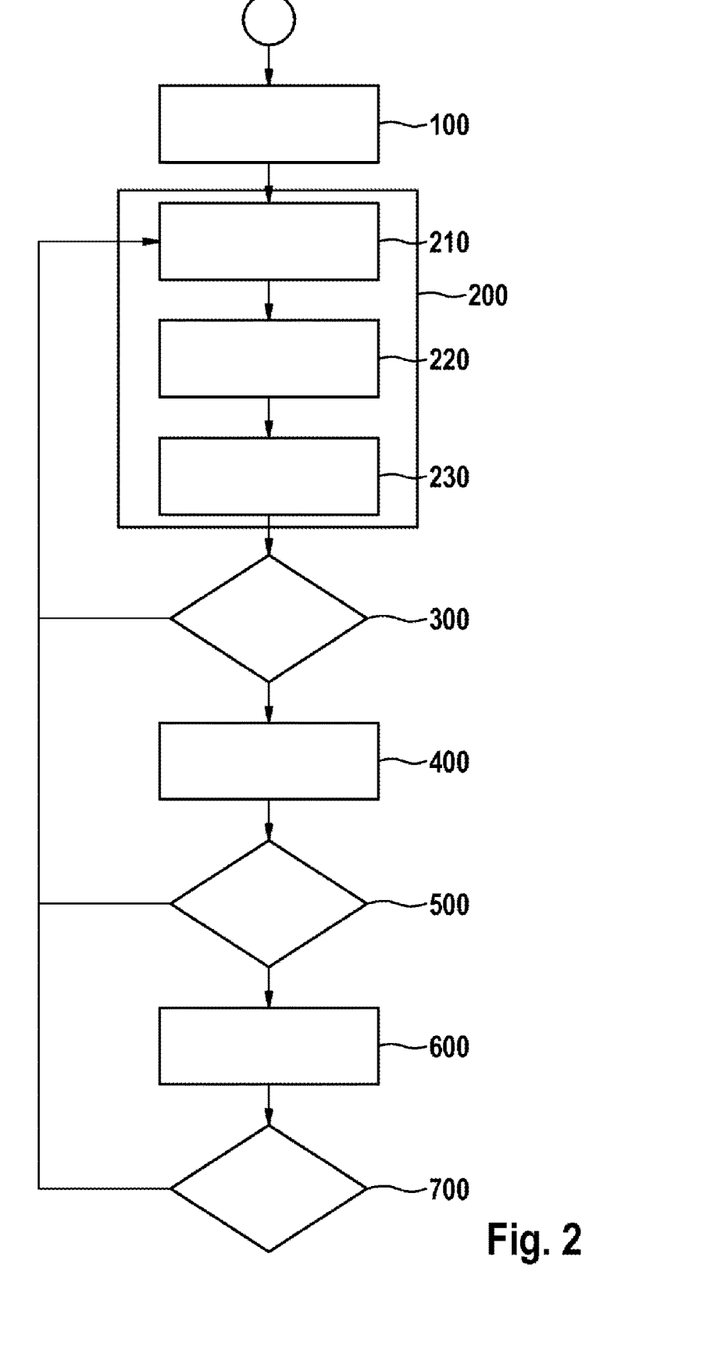
FIG. 2 shows a flowchart for explaining the method for starting up a terminal in the monitoring system from FIG. 1.

In order to explain the process of setting up a connection between the terminal 7 and the device manager 14, reference is made to FIG. 2.

In a step 100, the terminal 7 is switched on, is connected to a voltage supply or is connected to the first network 2, so that a start-up of the terminal 7 takes place.

In a step 200, a message N is transmitted from the terminal 7 to the server 13, in particular to the device manager 14, as a knock. The transmission can be implemented by a connection module (not illustrated) of the control device 10 which is likewise in the form of a program or a service. The message N comprises the unique ID of the terminal 7.

The transmission of the message N to the server 13 starts an NAT session in the NAT device 6, in which case the associated connection information, in particular the IP addresses, ports and possibly timeouts, is stored in an NAT table. The NAT device 6 can use the stored information to correctly assign a response data packet from the device manager 14 or the server 13 to the respective terminal 7. A bidirectional connection is therefore initiated by transmitting the message N to the server 13.

If the server 13, in particular the device manager 14, receives the message N, the device manager 14 uses the unique ID to add the terminal 7 to a device list which is made available to the server 13 by the device manager. The device manager 14 also initiates an SSL handshake with the terminal 7.

In a step 300, the terminal 7 waits in order to determine whether it receives a response data packet from the device manager 14. If this is not the case, the transmission of the message N is repeated. If this is the case, the SSL handshake is accepted and a secure connection to the device manager 14 and therefore to the server 13 is established in a step 400.

For security, a step 500 checks whether the certificate of the device manager 14 matches the certificate stored in the storage device 11.

In a step 600, the established connection is kept open in order to be able to receive incoming requests from the device manager 14 or the server 13. If the connection is lost or there is a timeout in a step 700, the procedure is restarted.

Figure 3:
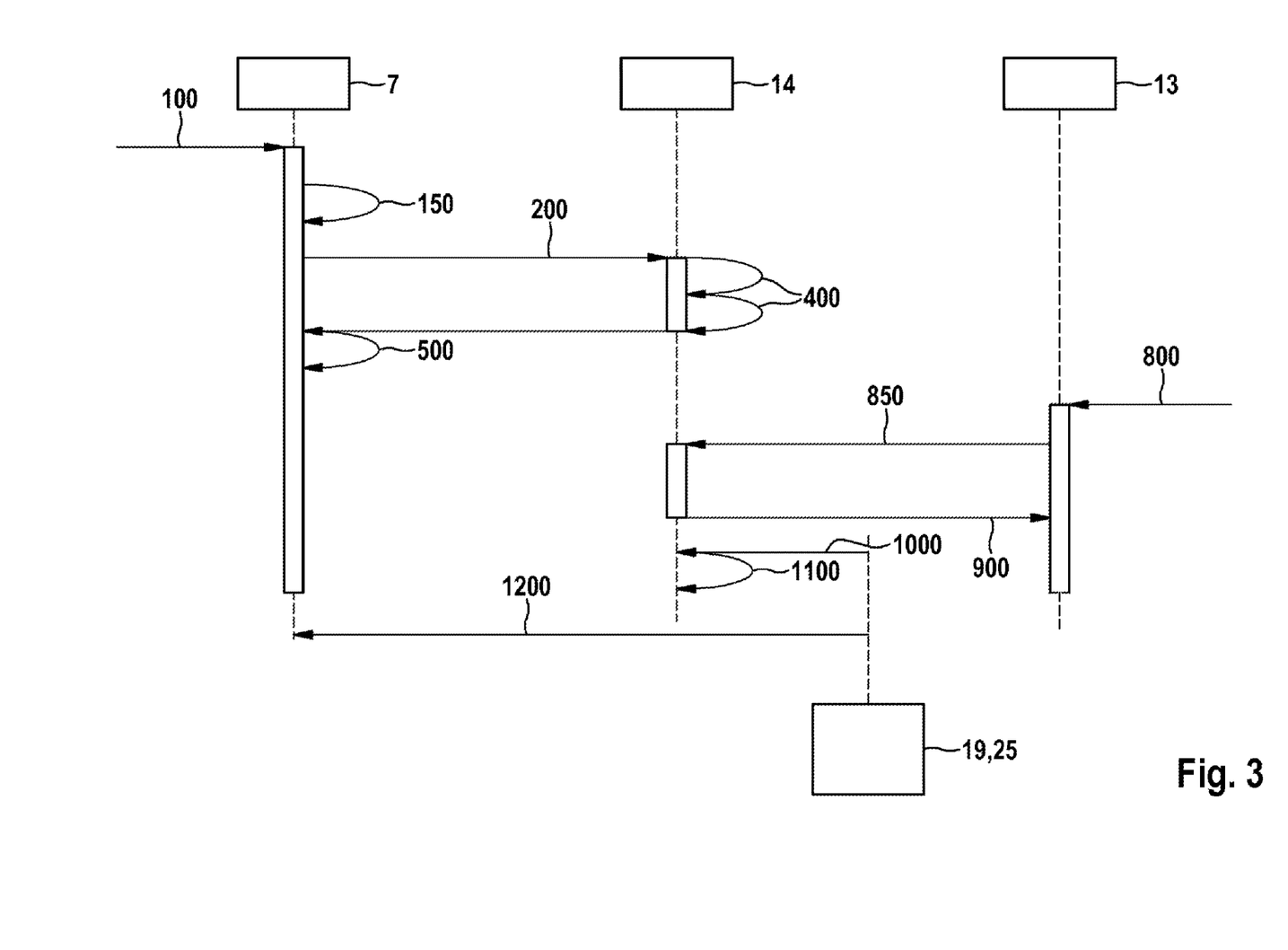
FIG. 3 shows a schematic diagram for explaining the method from FIG. 2 and establishing a transparent channel.

The client address in the first network 2 can be allocated manually, on the one hand, but it is simpler for the terminal 7 to automatically receive the client address in a step 150 (FIG. 3) via a DHCP functionality. FIG. 3 again shows the method in another illustration:

In step 100, the terminal 7 is switched on. In step 150, the terminal 7 receives the client address via DHCP. In step 200, the message N is transmitted to the device manager 14. In step 400, the terminal 7 is added to the device list and the SSL handshake is prepared. In step 500, the identity of the device manager 14 is validated by the terminal 7. It is optionally possible for an external query to be carried out in a step 800 in order to determine whether the server 13 or the device manager 14 is aware of new terminals 7. In this case, the server 13 addresses a request for new devices to the device manager 14 in a step 850 and the device list containing the terminals 7 is transmitted to the server 13 in a step 900.

Provision may optionally be made for the transmission of the message N to be repeated if step 300 has ascertained that no response has been received from the device manager 14 or the server 13 and the knock was therefore unsuccessful. In this case, the temporal length of a transmitting interval is determined in a step 210. In a step 220, the temporal length of the knock interval is awaited and the message N is transmitted again in a step 230.

As again emerges from the illustration in FIG. 1, the server 13 in the form of the security control device is connected in terms of data technology to one or more agent devices 19 via a further network 18. The further network 18 may correspond to the second network 4. Alternatively, it is possible for the further network 18 to be in the form of an intranet or another variant of the second network 4. However, it may also be in the form of a private IP network. In its entirety, the agent device 19 forms a control center 21 or a monitoring center. A plurality of such agent devices 19 are usually arranged in the control center 21, with the result that the control center 21 can be scaled on the basis of the number and size of objects to be monitored 3. The agent devices 19 are, in particular, in the form of workstations for the monitoring personnel 22. The agent devices 19 receive notifications, in particular alarm notifications or other notifications which have been transmitted by the terminals 7, with the result that these notifications can be processed by the monitoring personnel 22.

The server 13 in the form of the security control device is connected to at least one client device 25 via the second network 4 or a further network. The client device 25 is in the form of a mobile terminal, in particular a mobile telephone or smartphone. The client devices 25 are assigned, for example, to mobile monitoring personnel 22 or to other persons involved in the monitoring system 1.

The agent devices 19 and the client devices 25 form user devices in the monitoring system 1.

During operation of the monitoring system 1, it is necessary for the user devices, that is to say the agent devices 19 and/or client devices 25, to communicate with the terminals 7 in order to request sensor data, in particular image data, change settings, transmit commands etc., for example. However, for direct communication between the user device 19, 25 and the terminals 7, the network addresses would have to be mutually known. Since the terminals 7 are arranged downstream of the NAT device 6, the router 5 or the NAT device 6 would have to provide its own network address and an item of port information, with the result that the user devices 19, 25 can directly communicate with the terminals 7. However, this is often not desirable for security reasons.

Against this background, the device manager 14 assumes the function of establishing a transparent channel between the user device 19, 25 and the terminal 7.

Considered more closely, the knocking function described above is used to set up a client connection between the terminal 7 and the device manager 14 or the server 13. The client connection can be set up as described above or in another manner.

The device manager 14 or the server 13 is assigned a server address SA_C to which the terminal 7 can transmit terminal messages EN. In contrast, the terminal 7 is assigned a terminal address EG which, in the monitoring system 1 shown, is formed by the network address of the NAT device and an item of port information. The device manager 14 and the server 13 use the terminal address EG to transmit first server messages SN1 to the terminal 7.

The user devices 25, 19 each have a user device address BA_25, BA_19 and communicate with the device manager 14 or the server 13 via a user connection, in which case they use a server address SA_B. The server address SA_C may be the same as the server address SA_B, but they may also be different server addresses. The user connections can be used to transmit user messages BN to the device manager 14 and to transmit second server messages SN_2 to the user device 19, 25.

In order to establish a transparent channel between the user devices 19, 25 and the terminal 7, the device manager 14 readdresses user messages BN addressed to a specific terminal 7 and forwards them as server messages SN1 to the terminal address EG and therefore to the specified terminal 7. In the opposite direction, terminal messages EN which are intended to be delivered to a user device 19 or 25 are readdressed by the device manager 14, with the result that they are forwarded to the user devices 19, 25 as server messages SN_2. As a result of this procedure, there is no need to establish any further connection between the user device 19, 25 and the terminal 7 in addition to the already existing client connection between the terminal 7 and the device manager 14.

However, it may prove to be advantageous if a second client connection is already created in an anticipatory manner between the device manager 14 and the terminal 7 when establishing a transparent channel between a user device 19, 25 and the terminal 7 in order to possibly be able to process incoming, parallel requests from other user devices 19, 25.

FIG. 3 illustrates the establishment of the transparent channel: in a step 1000, a connection request from the user device 19, 25 is made to the device manager 14. The device manager 14 processes the connection request and connects the client connection to the user connection to form the terminal/user connection in a step 1100. In a step 1200, the terminal/user connection is established, with the result that bidirectional communication can take place between the user device 19, 25 and the terminal.

For the purpose of implementing the user connection between the user device 19, 25 and the device manager 14, it is possible to select routes different in order to be able to clearly control the association between the user device 19, 25 and the terminal 7 even in the case of a multiplicity of terminal/user connections. Firstly, it is possible for a port on the device manager 14 which is assigned to the terminal 7 to be allocated to the user devices 19, 25 on the basis of the desired terminal 7. Secondly, it is possible for the same port on the device manager 14 to be allocated to a plurality of user devices 19, 25, the desired terminal being specified by transmitting an item of additional information. Thirdly, it is possible to create and to allocate a ticket for each terminal/user connection, the user devices 19, 25 referring to the ticket and being connected to the desired terminal 7 in this manner.

The invention claimed is:

1. A monitoring system for an object to be monitored, the monitoring system comprising:
a local monitoring network including a first terminal;
a security control device, the local monitoring network being communicatively coupled to the security control device via a second network using a client connection, wherein the security control device is configured to
establish a communicative connection with the first terminal through the second network,
transmit server messages to the first terminal, wherein the server messages transmitted to the first terminal are addressed by the security control device to a terminal address of the first terminal, and
receive terminal messages from the first terminal, wherein the terminal messages are addressed by the first terminal to a server address of the security control device;
a first user device communicatively coupled to the security control device using a user connection, wherein the first user device is configured to
receive server messages transmitted from the security control device, wherein the server messages received from the security control device are addressed by the security control device to a user address of the first user device, and
transmit user messages to the security control device, wherein the user messages transmitted from the first user device to the security control device are addressed by the first user device to the server address of the security control device,
wherein the security control device includes a device manager configured to create a user/terminal connection between the first terminal and the first user device by
readdressing terminal messages to the user address of the first user device, wherein the terminal messages are received from the first terminal and are addressed to the server address,
forwarding the readdressed terminal messages to the first user device as server messages addressed to the user address of the first user device,
readdressing user messages to the terminal address of the first terminal, wherein the user messages are received from the first user device and are addressed to the server address, and
forwarding the readdressed user messages to the first terminal as server messages addressed to the terminal address of the first terminal;
wherein the device manager forms a bidirectional communication channel as the user/terminal connection including a transparent virtual direct connection between the first terminal and the first user device where all messages sent between the first terminal and the first user device are forwarded by the device manager without further processing by the device manager other than readdressing.

2. The monitoring system of claim 1, wherein the first terminal includes a storage device storing the server address, and wherein the first terminal is configured to transmit a message to the server address during initialization of the first terminal in order to initialize or establish the client connection.

3. The monitoring system of claim 1, wherein the local monitoring network and the second network are communicatively coupled via at least one NAT device, such that the client connection runs from the first terminal to the security control device via the at least one NAT device and terminal messages are transmitted from the first terminal to the security control device via the at least one NAT device.

4. The monitoring system of claim 1, wherein the device manager establishes a substitute client connection in addition to the client connection.

5. The monitoring system of claim 1, wherein the device manager is configured to keep the client connection open by means of a quiescent protocol.

6. The monitoring system of claim 1, wherein the local monitoring network includes a plurality of terminals, and wherein the device manager is configured to provide a separate port for the first user device in the server address for each user/terminal connection.

7. The monitoring system of claim 1, wherein the local monitoring network includes a plurality of terminals, wherein the device manager is configured to provide a common port for user devices in the server address for a plurality of user/terminal connections, and wherein a specific terminal of the plurality of terminals is identified in user messages by an addendum in the server address.

8. A method for communicating in the monitoring system of claim 1, the method comprising:
    forwarding, by the device manager, the terminal messages from the first terminal to the user address as server messages; and
    forwarding, by the device manager, the user messages from the first user device to the terminal address as server messages and thereby establishing a user/terminal connection between the terminal and the user device.

9. The monitoring system of claim 1, wherein the device manager further includes a processor and memory storing program code that, when executed by the processor, causes the device manager to establish a user/terminal connection between the at least one terminal and the user device by
    forwarding the terminal messages from the first terminal to the user address as first server messages, and
    forwarding the user messages from the first user device to the terminal address as server messages.

10. The monitoring system of claim 1, wherein the first terminal includes a web server, wherein the device manager forms a virtual direct connection as the user/terminal connection between the first terminal and the first user device, and wherein through the virtual direct connection the first user device accesses the web server as though communication between the first user device and the first terminal were made between devices on a local network.

* * * * *